(12) United States Patent
Sato et al.

(10) Patent No.: US 11,441,056 B2
(45) Date of Patent: Sep. 13, 2022

(54) WET AND DRY SURFACE ADHESIVES

(71) Applicant: 3M INNOVATIVE PROPERTIES COMPANY, St. Paul, MN (US)

(72) Inventors: Shinobu Sato, Tokyo (JP); Shimpei Kudo, Kanagawa (JP); Gregg A. Patnode, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 408 days.

(21) Appl. No.: 16/625,413

(22) PCT Filed: Jun. 27, 2018

(86) PCT No.: PCT/US2018/039709
§ 371 (c)(1),
(2) Date: Dec. 20, 2019

(87) PCT Pub. No.: WO2019/005932
PCT Pub. Date: Jan. 3, 2019

(65) Prior Publication Data
US 2022/0135856 A1    May 5, 2022

Related U.S. Application Data

(60) Provisional application No. 62/527,190, filed on Jun. 30, 2017.

(51) Int. Cl.
| | |
|---|---|
| C08F 2/46 | (2006.01) |
| C08F 2/50 | (2006.01) |
| C08G 61/04 | (2006.01) |
| C09J 133/08 | (2006.01) |
| C08F 220/18 | (2006.01) |
| C08F 220/28 | (2006.01) |
| C08F 2/48 | (2006.01) |
| C08F 2/38 | (2006.01) |
| C08K 5/42 | (2006.01) |
| C08K 5/19 | (2006.01) |
| C08K 5/521 | (2006.01) |
| C09J 133/06 | (2006.01) |
| C08K 5/14 | (2006.01) |

(52) U.S. Cl.
CPC .............. *C09J 133/08* (2013.01); *C08F 2/38* (2013.01); *C08F 2/48* (2013.01); *C08F 220/1808* (2020.02); *C08F 220/283* (2020.02); *C08K 5/14* (2013.01); *C08K 5/19* (2013.01); *C08K 5/42* (2013.01); *C08K 5/521* (2013.01); *C09J 133/064* (2013.01); *C08K 2201/019* (2013.01)

(58) Field of Classification Search
CPC .............. C08F 2/50; C08F 2/48; C08G 61/04
USPC ................... 522/154, 150, 1; 520/1
See application file for complete search history.

(56) References Cited

U.S. PATENT DOCUMENTS

| | | | |
|---|---|---|---|
| 4,181,752 A | | 1/1980 | Martens |
| 4,303,485 A | | 12/1981 | Levens |
| 4,329,384 A | | 5/1982 | Vesley |
| 4,330,590 A | | 5/1982 | Vesley |
| 4,619,979 A | | 10/1986 | Kotnour |
| 4,737,559 A | | 4/1988 | Kellen |
| 4,843,134 A | | 6/1989 | Kotnour |
| 5,397,614 A | | 3/1995 | Patnode |
| 5,407,971 A | | 4/1995 | Everaerts |
| 5,637,646 A | | 6/1997 | Ellis |
| 5,804,610 A | | 9/1998 | Hamer |
| 6,855,386 B1 | | 2/2005 | Daniels |
| 8,030,395 B2 | | 10/2011 | Tseng |
| 9,102,774 B2 | | 8/2015 | Clapper |

FOREIGN PATENT DOCUMENTS

| | | |
|---|---|---|
| JP | 11140407 | 5/1999 |
| JP | 2001-11422 | 1/2001 |
| JP | 2001-89730 | 4/2001 |
| JP | 2001106985 | 4/2001 |
| JP | 2009-173707 | 8/2009 |
| WO | WO 1995-029770 | 11/1995 |
| WO | WO 97/05171 | 2/1997 |
| WO | WO 1997-007161 | 2/1997 |
| WO | WO 00/56828 | 9/2000 |
| WO | WO 2000-078884 | 12/2000 |
| WO | WO 01/48111 | 7/2001 |
| WO | WO 01/48111 A1 | 7/2001 |
| WO | WO 2015-153769 | 10/2015 |
| WO | WO 2015/153987 A1 | 10/2015 |
| WO | WO 2018-031668 | 2/2018 |

OTHER PUBLICATIONS

International Search report for PCT International Application No. PCT/US2018/039709 dated Oct. 9, 2018, 4 pages.

*Primary Examiner* — Jessica Whiteley

(57) ABSTRACT

A pressure sensitive adhesive comprising the polymerization product of a reaction mixture comprising: (a1) one or more (meth)acrylate ester monomers; (a2) one or more hydrophilic monomers; and (b) non-reactive, ionic surfactant. Also, articles comprising such adhesives and methods for making such adhesives and such articles.

15 Claims, No Drawings

WET AND DRY SURFACE ADHESIVES

CROSS REFERENCE TO RELATED APPLICATIONS

This application is a national stage filing under 35 U.S.C. § 371 of PCT/IB2018/039709, filed Jun. 27, 2018, which claims the benefit of U.S. Provisional Application No. 62/527,190, filed Jun. 30, 2017, the disclosure of which is incorporated by reference in its/their entirety herein.

FIELD OF THE INVENTION

This invention pertains to pressure-sensitive adhesives, and more particularly to non-emulsion, solventless acrylate based pressure-sensitive adhesives incorporating a hydrophilic comonomer and a non-reactive ionic surfactant within the polymer matrix. The adhesives exhibit the properties of good tack and strong adhesion to both wet and dry surfaces.

BACKGROUND

Pressure sensitive adhesives that adhere effectively to wet or moist surfaces, so-called "wet-stick" adhesives, are useful in selected industrial, commercial and consumer applications. In pharmaceutical and other medical fields, wet-stick adhesives are typically used for adhering articles such as tapes, bandages, dressings, and drapes to moist skin surfaces such as wounds or areas of the body prone to moistness. Wet-stick adhesives also find use in outdoor or exterior applications, such as on pavement surfaces (e.g., asphalt pavement, cement, and concrete pavement), and marine and automotive coatings and surfaces. Wet-stick adhesives are also used on labels for food containers and other products that are exposed to moisture due to condensation or subjected to water or ice immersion.

(Meth)acrylate pressure sensitive adhesives are attractive materials for many tape and label applications. (Meth) acrylates are known for their optical clarity, oxidative resistance, and inherently tacky nature. Inherently tacky (meth) acrylate pressure sensitive adhesives (i.e., materials that require no additives such as tackifying resins in order to provide desired tack) are typically formulated predominately from acrylic acid ester monomers of non-tertiary alcohols. Examples of such monomers include n-butyl acrylate, 2-ethylhexyl acrylate, isooctyl acrylate, isononyl acrylate, isodecyl acrylate and dodecyl acrylate. For applications where room temperature tack is desired, (meth)acrylate monomers which when polymerized yield homopolymers having glass transition temperatures ($T_g$) of less than about 0° C. are typically used. However, such (meth)acrylate polymers are hydrophobic in nature (i.e., solubility with water is less than 1 weight %) and, without modification, are generally unsuitable for use as wet-stick adhesives.

A means to render (meth)acrylate polymers more hydrophilic is to copolymerize the (meth)acrylate monomers with hydrophilic acidic comonomers, such as acrylic acid, methacrylic acid, beta-carboxyethyl acrylate, itaconic acid, sulfoethyl acrylate, and the like. Addition of these hydrophilic acidic comonomers in minor amounts (e.g., about 1 to about 15 wt %, preferably 1 to 10 wt %) can also enhance the internal or cohesive strength of the resultant PSA. This increased polymer reinforcement, however, can diminish the tack of the resultant copolymer. The use of hydrophilic acidic comonomers can produce adhesive compositions that will cross-link and exhibit degraded performance on surfaces that contain metal cations, such as concrete. Alternatively, to improve performance on surfaces containing metal cations, the hydrophilic acidic comonomers can be replaced with hydrophilic non-acidic monomers selected from the group consisting of N,N-dimethyl acrylamide, N,N-diethyl acrylamide, tert-octyl acrylamide, N,N-dimethyl methacrylamide, N,N-diethyl methacrylamide, n-octyl acrylamide, and mixtures thereof. At higher acidic or non-acidic comonomer levels, (meth)acrylate copolymers can dramatically lose their tack and become highly hydrophilic. When exposed to water, the moisture helps to transform these highly acidic, low tack compositions into tacky materials that are suitable as wet-stick adhesives used in many medical applications. When the water evaporates, these adhesives lose their pressure-sensitive tack. Such compositions can also be useful as water-soluble or water dispersible adhesives. Water-dispersible or soluble (meth)acrylate copolymers can be formulated as repulpable adhesives used to splice dry paper rolls and designed to lose adhesive integrity and fully degrade when undergoing paper recycling operations.

U.S. Pat. No. 6,855,386 (Daniels et al.) discloses wet-stick adhesives comprising the reaction product of (meth) acrylate copolymers, hydrophilic acidic comonomer, and a non-reactive, non-ionic plasticizing agent.

When producing wet-stick adhesives based on (meth) acrylate copolymers having high levels of acidic or non-acidic comonomers, it is necessary to provide a means to overcome the glassy nature of the adhesive. While such systems will produce a bond in the presence of surface moisture, they have the disadvantage of being relatively low tack systems that take time for the bond to form in the presence of water. The time required for such adhesives to bond in the presence of water is of a greater magnitude that the time required to apply the adhesives. In addition, these systems do not make strong or quick bonds in the absence of moisture. One means to address the stiffness of such adhesives is incorporation of a non-reactive, non-ionic plasticizer such as described in U.S. Pat. No. 6,855,386 (Daniels et al.). These systems have the disadvantage of potential plasticizer migration out of the adhesive when immersed in water. In addition, the incorporation of the high levels of a non-reactive plasticizer into the adhesive can dilute the adhesive polymer entanglements producing adhesives having inherently low shear strength.

Another means to address the stiffness associated with high acidic comonomer adhesives is incorporation of a reactive agent that will function as a plasticizer to lower adhesive $T_g$ and modulus. U.S. Pat. No. 5,397,614 (Patnode et al.) discloses alkali dispersible pressure sensitive adhesive compositions based on a terpolymer system containing (meth)acrylate comonomer, beta carboxyethylacrylate comonomer and ethylene oxide acrylate comonomer. The ethylene oxide acrylate monomer acts as a plasticizer that is incorporated into the polymer backbone. The system is neutralized with metal salt to control level of tack and dispersibility. These adhesives, however, do not have wet-stick properties and are only used in systems with hydrophilic acidic comonomer.

U.S. Pat. No. 8,030,395 (Tseng et al.) discloses an emulsion acrylate pressure sensitive adhesive which utilizes a 0.1 to 2 parts reactive ionic surfactant in a latex binder. The low level of reactive ionic surfactant is present to provide the ability to produce an emulsion acrylate adhesive. These adhesives do not have effective wet-stick properties.

There exists a need for new wet-stick pressure sensitive adhesives that have good dry and wet adhesion, good tack, and stability. There is also the need for wet stick compositions that utilize plasticizing agents which are inherently more stable in the adhesive matrix than the non-reactive, non-ionic plasticizers previously disclosed.

SUMMARY

The present invention provides novel pressure sensitive adhesive compositions based on (meth)acrylate ester copolymers that provide surprising performance, articles comprising such adhesive formulations, and methods for making such adhesive formulations.

Adhesive compositions of the invention comprise the reaction product of a reaction mixture comprising: (a) select polymerizable components (i.e., certain (meth)acrylate ester monomers and certain hydrophilic comonomers), (b) high proportion of select non-reactive surfactants, (c) optional initiator(s), and (d) optional chain transfer agents, all as described herein. Polymerizable components in adhesives of the invention include (a1) (meth)acrylate comonomers and (a2) hydrophilic non-acidic or hydrophilic acidic monomers (e.g., N,N-Dimethylacrylamide (nnDMA), acrylic acid, or the like), and, optionally, in some embodiments (a3) other comonomers. Useful surfactants include non-reactive, ionic surfactant of the type used for the production of emulsion acrylate adhesives.

It has been surprisingly discovered that if such polymerizable components (i.e., (a1) (meth)acrylate ester monomers and (a2) hydrophilic comonomers), when present in a range of (a1):(a2) weight ratios of from about 1:1 to about 1.5:1, are polymerized in the presence of a non-reactive ionic surfactant at levels of at least about 10 wt (by weight based on total weight of the surfactant plus (a1) (meth)acrylate ester monomers and (a2) hydrophilic comonomers) to about 30 wt % in the composition provides stable adhesive compositions with wet and dry adhesion, and good tack. As a result, these novel compositions provide heretofore unattained and surprising combinations of performance properties enabling surprising, heretofore unattained advantages.

Briefly, in one aspect the present invention is a pressure sensitive adhesive comprising the reaction product of a reaction mixture comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic non-acidic monomers or one or more hydrophilic acidic monomers; and (b) one or more non-reactive, ionic surfactants;

wherein the one or more (meth)acrylate ester monomers and the one or more hydrophilic monomers are present in a weight ratio of about 1:1 to about 1.5:1 and the surfactant is present at about 10 wt % to about 30 wt (by weight based on total weight of the surfactant plus (a1) (meth)acrylate ester monomers and (a2) hydrophilic comonomers). Such adhesive compositions have been discovered to adhere surprisingly well to wet substrate surfaces.

Advantageously, pressure sensitive adhesives of the present invention are hydrophilic in character, but do not suffer the usual problems often described in the art of low tack and poor adhesion to dry surfaces. The novel adhesives of the present invention provide quick stick, high or acceptably good tack (i.e., an ASTM D3121 rolling ball tack value of less than 60 mm or of less than 250 mm, respectively), and high or acceptably good adhesion (i.e., a 90° peel adhesion to a surface of greater than 10 N/25 mm, or of greater than 5 N/25 mm, respectively) to both wet and dry surfaces.

In another aspect of the present invention, a hot melt pressure sensitive adhesive is provided wherein the hot melt pressure sensitive adhesive comprises a wet-stick pressure sensitive adhesive having a flow temperature and a thermoplastic packaging material enveloping said wet-stick pressure sensitive adhesive, the thermoplastic packaging material having a melting temperature lower than the flow temperature of the wet-stick pressure sensitive adhesive, wherein the adhesive comprises the reaction product of a polymerizable composition comprising (a) polymerizable components (a1) one or more hydrophobic (meth)acrylate ester monomers that when polymerized in the absence of other comonomers yield a polymer or copolymer having a $T_g$ of less than about 10° C.; (a2) one or more hydrophilic acidic or hydrophilic non-acidic monomers; and (b) one or more non-reactive, ionic surfactants;

wherein the one or more (meth)acrylate ester monomers and the one or more hydrophilic monomers are present in a weight ratio of about 1:1 to about 1.5:1 and the surfactant is present at about 10 wt % to about 30 wt (by weight based on total weight of the surfactant plus (a1) (meth)acrylate ester monomers and (a2) hydrophilic comonomers).

In yet another aspect of the present invention, an article is provided wherein the article comprises a substrate; and a hot melt pressure sensitive adhesive on at least a portion of a surface of the substrate, the hot melt adhesive comprising a mixture of a pressure sensitive adhesive having a flow temperature and a thermoplastic material having a melting temperature that is less than the flow temperature of the pressure sensitive adhesive, the pressure sensitive adhesive comprising the reaction product of a reaction mixture comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic acidic or one or more hydrophilic non-acidic monomers; and (b) one or more non-reactive, ionic surfactants;

wherein the one or more (meth)acrylate ester monomers and the one or more hydrophilic monomers are present in a weight ratio of about 1:1 to about 1.5:1 and the surfactant is present at about 10 wt % to about 30 wt (by weight based on total weight of the surfactant plus (a1) (meth)acrylate ester monomers and (a2) hydrophilic comonomers).

In yet another aspect of the present invention, a method for preparing a pressure sensitive adhesive comprising the steps of:

(1) preparing a solventless reaction mixture comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic acidic or non-acidic monomers; and (b) one or more non-reactive, ionic surfactants;

wherein the one or more (meth)acrylate ester monomers and the one or more hydrophilic monomers are present in a weight ratio of about 1:1 to about 1.5:1 and the surfactant is present at about 10 wt % to about 30 wt (by weight based on total weight of the surfactant plus (a1) (meth)acrylate ester monomers and (a2) hydrophilic comonomers); and (2) reacting the reaction mixture to polymerize the polymerizable components to yield the pressure sensitive adhesive.

In yet another aspect of the present invention, a method for preparing a hot melt pressure sensitive adhesive comprising the steps of:

(1) preparing a solventless reaction mixture comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic acidic or one or more non-acidic monomers; and (b) one or more non-reactive, ionic surfactants;

wherein the one or more (meth)acrylate ester monomers and the one or more hydrophilic monomers are present in a weight ratio of about 1:1 to about 1.5:1 and the surfactant is present at about 10 wt % to about 30 wt (by weight based on total weight of the surfactant plus (a1) (meth)acrylate ester monomers and (a2) hydrophilic comonomers); and (2) enveloping the polymerizable composition in a thermoplastic packaging material; and (3) exposing the enveloped polymerizable mixture to radiation in an amount sufficient to polymerize the polymerizable mixture and to form the pressure sensitive adhesive that adheres well to wet and dry substrate surfaces, said pressure sensitive adhesive having a flow temperature, wherein the thermoplastic packaging material has a melting temperature lower than the flow temperature of the pressure sensitive adhesive.

In yet another aspect of the present invention, a method for preparing a hot melt pressure sensitive adhesive comprising the steps of:

(1) preparing a prepolymeric syrup comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic non-acidic comonomers or one or more hydrophilic acidic comonomers; (b) optionally about 10 wt % to about 30 wt (by weight based on total weight of the surfactant plus (a1) (meth)acrylate ester monomers and (a2) hydrophilic comonomers), of a reactive, ionic surfactant; and (c) one or more photoinitiators;

wherein the one or more (meth)acrylate ester monomers and the one or more hydrophilic monomers are present in a weight ratio of about 1:1 to about 1.5:1, the surfactant is present at about 10 wt % to about 30 wt % (by weight based on total weight of the surfactant plus (a1) (meth)acrylate ester monomers and (a2) hydrophilic comonomers), and the photoinitiator is present at about 0.04 wt %, based on the total weight of the reaction mixture;

(2) mixing the prepolymeric syrup until photoinitiator dissolves;

(3) exposing the prepolymeric syrup to UV-A light having a spectrum which includes 350 nm, until syrup has sufficient viscosity deemed appropriate for coating;

(4) adding an additional 0.1 wt % of at least one photoinitiator, and about 10 wt % to about 30 wt % (by weight based on total weight of the surfactant plus (a1) (meth) acrylate ester monomers and (a2) hydrophilic comonomers), of a reactive, ionic surfactant if it was not added in step (1) (for instance, to optimize chain transfer properties), and mixing until the photoinitiator is dissolved and reaction mixture is well mixed to yield a syrup;

(5) coating the resulting syrup, optionally using a notch bar, between two release liners, optionally comprising a polyester; and (6) exposing the coated syrup, optionally from both sides, to UV-A light having a spectrum which includes 350 nm, optionally providing an approximate total energy of at least 1440 milliJoules/square centimeter.

The adhesives and methods for forming them can be used to make a variety of useful adhesive articles such as tapes, pavement markings, labels, patches, etc.

Glossary

As used herein in this application, the following terms and acronyms have the indicated meaning.

"Pressure-sensitive adhesive" or "pressure sensitive adhesive" or "PSA" refers to a viscoelastic material that possesses the following properties: (1) aggressive and permanent tack, (2) adherence with no more than finger pressure, and (3) sufficient ability to hold onto a substrate.

"Wet-stick adhesive" refers to a material that exhibits pressure-sensitive adhesive properties when adhered to a substrate that has been flooded with water. Wet-stick adhesives generally may or may not demonstrate pressure-sensitive adhesive properties under dry conditions. Adhesives of the invention are wet-stick adhesives and do demonstrate pressure sensitive adhesive properties under dry conditions.

"Hot melt adhesive" refers to a material that is heated to above room or ambient temperature to increase flow or tendency to wet an adherend, resulting in bond upon cooling to ambient temperature. Hot melt adhesives may or may not exhibit a degree of pressure sensitive character.

"High-tack" refers to adhesive tack value of less than 60 mm as measured by rolling ball test using ASTM D3121.

"Good-tack" refers to adhesive tack value of less than 250 mm as measured by rolling ball test using ASTM D3121.

"High-adhesion" refers to 90° peel adhesion to a NAKA-ICHI™ Pre Stone Mini Red concrete interlocking block of greater than 10 N/25 mm as measured using an Aikoh Engineering Model RZ-100 Push-Pull gauge.

"Good-adhesion" refers to 90° peel adhesion to a NAKA-ICHI™ Pre Stone Mini Red concrete interlocking block of greater than 5 N/25 mm as measured using an Aikoh Engineering Model RZ-100 Push-Pull gauge.

"(Meth)acrylate monomers" or "(meth)acrylate ester monomers" are acrylic acid esters or methacrylic acid esters of non-tertiary alcohols, the alcohols preferably having 4 to 12 carbon atoms, and any terms beginning with "(meth) acryl" are similarly intended to be inclusive of "acryl" and "methacryl".

"Hydrophilic acidic comonomers" or "hydrophilic non-acidic comonomers" are water soluble ethylenically unsaturated, free radically reactive monomers having carboxylic, sulfonic or phosphonic acid functionality and are copolymerizable with the (meth)acrylate monomers.

"Non-Reactive ionic surfactant" refers to a compound having a hydrophilic group with ionic functionality, a hydrophobic group, and, optionally a poly alkylene oxide group.

DETAILED DESCRIPTION OF ILLUSTRATIVE EMBODIMENTS

Generally, a wet-stick pressure-sensitive adhesive of the present invention comprises the reaction product of a reaction mixture comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic non-acidic monomers or one or more acidic comonomers; and (b) one or more non-reactive, ionic surfactants;

wherein the one or more (meth)acrylate ester monomers and the one or more hydrophilic monomers are present in a weight ratio of about 1:1 to about 1.5:1 and the surfactant is present at about 10 wt % to about 30 wt (by weight based on total weight of the surfactant plus (a1) (meth)acrylate ester monomers and (a2) hydrophilic comonomers).

In some embodiments, the adhesive will comprise the reaction product of a reaction mixture further comprising one or both of (c) optional initiator(s), and (d) optional chain transfer agents.

In some embodiments, the adhesive will comprise the reaction product of a reaction mixture consisting essentially of (a) such polymerizable compounds and (b) such surfactant. In some embodiments, the adhesive will comprise the reaction product of a reaction mixture consisting essentially of (a) such polymerizable compounds, (b) such surfactant, (c) one or more optional initiator(s), and (d) one or more optional chain transfer agents.

(a) Polymerizable Components

Adhesives of the invention are formed from reaction mixtures comprising select polymerizable components, including (a1) one or more (meth)acrylate ester monomers and (a2) one or more hydrophilic non-acidic comonomers or one or more hydrophilic acid comonomers. The polymerizable components are described in more detail.

(a1) (Meth)acrylate Ester Monomers

Adhesives of the present invention contain at least one unsaturated monomer selected from the group consisting of (meth)acrylate esters of non-tertiary alkyl alcohols, the alkyl groups of which preferably comprise from 4 to 12, more preferably 4 to 8 carbon atoms; and mixtures thereof. The (meth)acrylate ester monomers may contain a small proportion of di- or multi-functionality but are preferably substantially completely monofunctional to minimize undesired gelling or cross-linking.

Preferred (meth)acrylate monomers have the following general Formula (I):

Formula (I)

wherein $R^1$ is H or $CH_3$, the latter corresponding to where the (meth)acrylate monomer is a methacrylate monomer; $R^2$ is broadly selected from linear or branched hydrocarbon groups and may contain one or more heteroatoms, and the number of carbon atoms in the hydrocarbon group is preferably 4 to 12, and more preferably 4 to 8.

Illustrative examples of (meth)acrylate monomers useful in the present invention include n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxy ethoxyethyl acrylate, 2-octyl acrylate. Also suitable are monomers comprising structural isomers of a secondary alkyl (meth)acrylate and mixtures thereof, as described in U.S. Pat. No. 9,102,774 (Clapper et al.). Particularly preferred are n-butyl acrylate, 2-ethylhexyl acrylate, isooctyl acrylate, lauryl acrylate, and mixtures thereof.

(a2) Hydrophilic Comonomers

As is known to those skilled in the art, comonomers are used to improve cohesion of the resultant adhesive. Preferably, (meth)acrylate ester monomer(s) and hydrophilic comonomer(s) are selected, and used in proportions, to yield a polymerized product having a $T_g$ of about 20° C. or below, more preferably of about 10° C. or below, to provide dry adhesion as is desired. In accordance with the present invention, hydrophilic comonomers, typically non-acidic comonomers, are used to improve water absorption properties of the resultant adhesive to improve wet stick adhesion and to improve compatibility of the ionic surfactants with other components the composition. Hydrophilic Non-acidic comonomers are preferred when the adhesive may be exposed to surfaces that contain metal cations, such as concrete, that can result in the degradation of performance when hydrophilic acidic comonomers are used.

Illustrative examples of useful hydrophilic non-acidic comonomers include, but are not limited to, N,N-dimethyl acrylamide, N,N-diethyl acrylamide, tert-octyl acrylamide, N,N-dimethyl methacrylamide, N,N-diethyl methacrylamide, and n-octyl acrylamide.

Typically, the reaction mixtures from which adhesives of the invention are made comprise the (meth)acrylate ester monomers and the hydrophilic non-acidic monomers in a weight ratio of about 1:1 to about 1.5:1.

In some embodiments, hydrophilic acidic comonomers may be used instead of hydrophilic non-acidic comonomers, in particular, when the adhesive will not be exposed to surfaces that contain metal cations.

The hydrophilic comonomers used may contain a small proportion of di- or multi-functionality but are preferably substantially completely monofunctional to minimize undesired gelling or cross-linking.

Illustrative examples of useful hydrophilic acidic comonomers include, but are not limited to, those selected from ethylenically unsaturated carboxylic acids, ethylenically unsaturated sulfonic acids, ethylenically unsaturated phosphonic acids, and mixtures thereof. Illustrative examples of such compounds include those selected from acrylic acid, methacrylic acid, itaconic acid, fumaric acid, crotonic acid, citraconic acid, maleic acid, beta-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability and effectiveness in reinforcing (meth)acrylate pressure sensitive adhesives, particularly preferred hydrophilic acidic monomers are the ethylenically unsaturated carboxylic acids. Beta-carboxyethyl acrylate can be a preferred hydrophilic acidic comonomer. Acrylic acid can be a preferred hydrophilic acidic comonomer when used in combination with one or more other hydrophilic acidic monomer(s) to meet the other criteria of the present invention, good wet and dry adhesion plus good tack.

Minor amounts of monomers copolymerizable with the (meth)acrylate monomers and hydrophilic acidic monomers can be used. Examples of such monomers include (meth)acrylamides, vinyl esters, and N-vinyl lactams.

(a3) Other Comonomers

Another means to address the stiffness associated with high acidic comonomer adhesives is incorporation of a reactive agent that will function as a plasticizer to lower adhesive $T_g$ and modulus. An ethylene oxide acrylate monomer acts as a plasticizer that is incorporated into the polymer backbone. Polyalkyl glycol acrylate will also function to reduce $T_g$ of polymer backbone and reduce $T_g$ and modulus. An illustrative example is:

MPE-550A Methoxypolyethyleneglycol acrylate: (Osaka Organic Chemical Industry)

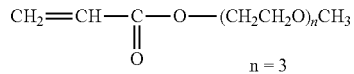

(b) Non-Reactive Ionic Surfactants

It has been discovered that when polymerizable components as described above are polymerized in the presence of non-reactive ionic surfactants that advantageous compositions exhibiting surprising properties result.

Non-reactive ionic surfactants useful herein include compounds having a hydrophilic group, and a hydrophobic group. Non-reactive ionic surfactants useful for the invention include ionic surfactants having poly(alkyleneoxide) structure but which are substantially free of vinyl functionality. Illustrative examples of useful ionic functionality include ammonium or sodium salts of sulfate and phosphoric acid. Some examples of materials for use in the present invention include-Poly(oxyethylene) alkyl ether ammonium sulfates available as HITENOL™ LA-10, LA-12, LA-16, NF-08 & NF-17 from Dai-ichi Kogyo Seiyaku Co., Ltd, Tokyo, Japan, and poly(oxyethylene) alkyl ether phosphate available as PLYSURF™ A208F from Dai-ichi Kogyo Seiyaku Co. These non-reactive ionic surfactants are believed to have the following structures:

Poly(oxyethylene) alkyl ether ammonium sulfate
RO(CH$_2$CH$_2$O)nSO$_3$M

Poly(oxyethylene) alkyl ether phosphate

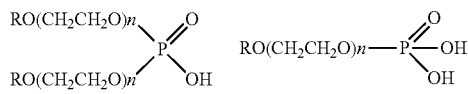

Reactive mixtures used in the present invention typically comprise, from about 10 wt % to about 30 wt (by weight based on total weight of the surfactant plus (a1) (meth) acrylate ester monomers and (a2) hydrophilic comonomers) of one or more non-reactive, ionic surfactants. In contrast, such materials are conventionally used at much lower proportions (e.g., 1 to 3 wt %) in the art. If excessive proportions of surfactant are used in the reactive mixture, the resultant adhesive may tend to have more than a single uniform phase as is desired.

The ratio and type of each comonomer in the wet-stick adhesive composition can be chosen within the stated limits to optimize the performance.

(c) Initiators

One or more free radical initiators is optionally added to aid in copolymerization of the (a1) (meth)acrylate ester monomers and (a2) hydrophilic comonomers.

As will be understood by those skilled in the art, selection of useful type of initiator used depends on the polymerization process. Photoinitiators which are useful for polymerizing the polymerizable mixture monomers include benzoin ethers such as benzoin methyl ether or benzoin isopropyl ether, substituted benzoin ethers such as 2-methyl-2-hydroxypropiophenone, aromatic sulfonyl chlorides such as 2-naphthalenesulfonyl chloride, and photoactive oxides such as 1-phenyl-1,1-propanedione-2-(o-ethoxycarbonyl) oxime. An example of a commercially available photoinitiator suitable for use in many embodiments is IRGACURE™ 651 (2,2-dimethoxy-1,2-diphenylethane-1-one, from Ciba-Geigy Corporation).

Illustrative examples of suitable thermal initiators include AIBN (i.e., 2,2'-azobis(isobutyronitrile), hydroperoxides, such as tert-butyl hydroperoxide, and peroxides, such as benzoyl peroxide and cyclohexane peroxide.

Generally, the photoinitiator is present in an amount of about 0.005 to about 1 weight percent based on the total weight of the copolymerizable monomers in the reaction mixture.

(d) Chain Transfer Agents

Optionally, the composition may also include one or more chain transfer agents to control the molecular weight of the polymerized compositions. Chain transfer agents are materials that regulate free radical polymerization and are generally known in the art. Illustrative examples of suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether and mixtures thereof.

The amount of chain transfer agent that is useful depends upon the desired final molecular weight of the polymerized reaction product and the type of chain transfer agent. The chain transfer agent is typically used in amounts from about 0 part to about 10 parts by weight per 100 parts of total polymerizable components (i.e., (a1) (meth)acrylate ester monomer plus (a2) hydrophilic comonomer plus, if any, (a3) other comonomer), and preferably from about 0 part to about 0.5 part.

Solventless Reaction Processes

Solventless polymerization methods, such as the continuous free radical polymerization method described in U.S. Pat. No. 4,619,979 (Kotnour et al.) and U.S. Pat. No. 4,843,134 (Kotnour et al.); the essentially adiabatic polymerization methods using a batch reactor described in U.S. Pat. No. 5,637,646 (Ellis); and, the methods described for polymerizing packaged polymerizable mixtures described in U.S. Pat. No. 5,804,610 (Hamer et al.) may also be utilized to prepare adhesives of the invention.

In one preferred embodiment of this latter method, from about 0.1 to about 500 g of the reaction mixture is completely surrounded by a packaging material. In some embodiments, from about 3 to about 100 g of the reaction mixture is surrounded by the packaging material. In other embodiments of the invention, the reaction mixture is only substantially surrounded by the packaging material. In yet other embodiments, the reaction mixture is disposed on the surface of a sheet, or between a pair of two substantially parallel sheets of packaging material. In another embodiment of the invention, the polymerizable mixture is substantially or completely surrounded by a hollow profile of packaging material with a length:square root of the cross-sectional area ratio of at least about 30:1.

The packaging material is made of a material that when combined with the adhesive does not substantially adversely affect the desired adhesive characteristics. In some embodiments, the packaging material is selected such that the resultant hot melt coated adhesive produced from a mixture of the adhesive and the packaging material exhibits improved adhesive properties compared to hot melt coated adhesive produced from adhesive alone.

The packaging material preferably melts at or below the processing temperature of the adhesive (i.e., the temperature at which the adhesive flows, or the flow temperature). The packaging material preferably has a melting point, or melting temperature, of about 200° C. or less, preferably about 170° C. or less. In a typically preferred embodiment the melting point ranges from about 90° C. to about 150° C. The packaging material may be a flexible thermoplastic polymeric film. The packaging material is preferably selected from ethylene-vinyl acetate, ethylene-acrylic acid, polypropylene, polyethylene, polybutadiene, or ionomeric films. In a preferred embodiment the packaging material is an ethylene-acrylic acid or ethylene-vinyl acetate film.

The amount of packaging material depends upon the type of material and the desired end properties. The amount of packaging material typically ranges from about 0.5 percent to about 20 percent of the total weight of the reaction mixture and the packaging material. Preferably, the packaging material is from about 2 percent to about 15 percent by weight, and more preferably from about 3 percent to about 5 percent. As will be understood, the packaging materials may contain plasticizers, stabilizers, dyes, perfumes, fillers, slip agents, antiblock agents, flame retardants, anti-static agents, microwave receptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

The transmissive energy may be selected from ultraviolet radiation, visible radiation, thermal radiation, or thermal conduction. The transmissive energy is preferably ultraviolet radiation or thermal conduction. Preferably, at least about 80 percent of the pre-adhesive is converted to adhesive; more preferably, at least about 90 percent of the pre-adhesive is converted to adhesive.

Thermal polymerization can be effected by immersing the packaged composition in a heat exchange medium at temperatures from about 40° C. to about 100° C. for a time sufficient to polymerize the composition. The heat exchange medium may be a forced or impinged gas or a liquid such as water, perfluorinated liquids, glycerin, or propylene glycol. The heat necessary for thermal polymerization may also be provided by a metal platen, heated metal rolls, or microwave energy.

The temperature at which the polymerization occurs depends upon the activation temperature of the initiator. For example, polymerization using VAZO™ 64, a commercially available initiator from DuPont Company can be carried out at about 65° C., while VAZO™ 52, also from DuPont Company, can be used at about 45° C.

It is preferable to carry out the polymerization in an appropriate liquid heat exchange medium at a controlled temperature. A suitable liquid heat exchange medium is water, heated to the desired reaction temperature. Commercially available heat transfer fluids may also be used. Additional information concerning thermal polymerization may be found in PCT Publication No. WO95/29770, entitled "Thermal Free-Radical Adhesives, Curing Method and Articles Made Thereby".

Polymerization can also be effected by exposure to ultraviolet (UV) radiation as described in U.S. Pat. No. 4,181,752 (Martens et al.). In a preferred embodiment, the polymerization is carried out with UV black lights having over 60 percent, and preferably over 75 percent of their emission spectra from about 280 to about 400 nm, with an intensity from about 0.1 to about 25 mW/cm$^2$.

During photopolymerization it is desirable to control the temperature by blowing cooling air around the packaged polymerizable mixture, by running the packaged polymerizable mixture over a cooled platen, or by immersing the packaged polymerizable mixture in a water bath or a heat transfer fluid during polymerization. Preferably, the packaged polymerizable mixtures are immersed in a water bath, with water temperatures from about 5° C. to 90° C., preferably below about 30° C. Agitation of the water or fluid helps to avoid hot spots during the reaction.

The packaged polymerized wet-stick adhesive compositions may be used to make a coatable hot melt adhesive by introducing the adhesive and its packaging material into a vessel in which the adhesive and its packaging material are melted. This hot melt adhesive may be used to form a pressure sensitive adhesive sheet by coating the melted adhesive and its packaging material onto a sheet material or another suitable substrate. The sheet material is preferably selected from a tape backing or a release liner. Preferably, the polymerized adhesives are hot melt coated by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun.

For any of these embodiments, the coatable hot melt adhesive can then be delivered out of a film die, subsequently contacting the drawn adhesive to a moving plastic web or other suitable substrate. A related coating method involves extruding the coatable hot melt adhesive and a coextruded backing material from a film die and cooling the layered product to form an adhesive tape. Other forming methods involve directly contacting the coatable hot melt adhesive to a rapidly moving plastic web or other suitable preformed substrate. Using this method, the adhesive blend is applied to the moving preformed web using a die having flexible die lips, such as a rotary rod die. After forming by any of these continuous methods, the resultant adhesive films or layers can be solidified by quenching using both direct methods (e.g., chill rolls or water baths) and indirect methods (e.g., air or gas impingement).

The packaged adhesive composition may further comprise an effective amount of a crosslinking agent that may be activated (e.g., by exposure to actinic radiation such as ultraviolet light or e-beam) after the adhesive has been hot melt coated to achieve further reaction. Typically, the amount ranges from about 0.01 to about 5.0 parts based upon 100 parts of the (meth)acrylate monomers and the hydrophilic acidic comonomers. The crosslinking agent can be added to the polymerized adhesive before or during hot melt coating, or it can be added to the polymerizable mixture. When added to the polymerizable mixture, the crosslinking agent can remain intact as a separate species in the adhesive, or it can be co-polymerized with the monomers. Crosslinking is preferably initiated after hot melt coating, and the crosslinking is preferably initiated by ultraviolet radiation, or ionizing radiation such as gamma radiation or electron beam (the use of separate crosslinking agents being optional in the case of ionizing radiation). Preferred crosslinking agents that can be added after reaction and before hot melt coating include multi-functional (meth)acrylates such as 1,6-hexanedioldiacrylate and trimethylolpropane triacrylate, and substituted triazines such as 2,4-bis(trichloromethyl)-6-(4-methoxyphenyl)-s-triazine and 2,4-bis(trichloromethyl)-6-(3,4-dimethoxyphenyl)-s-triazine, as described in U.S. Pat. No. 4,329,384 (Vesley et al.) and U.S. Pat. No. 4,330,590 (Vesley). Another class of preferred crosslinking agents are the copolymerizable mono-ethylenically unsaturated aromatic ketone comonomers free of ortho-aromatic hydroxyl groups such as those disclosed in U.S. Pat. No. 4,737,559 (Kellen et al.). Specific examples include para-acryloxybenzophenone, para-acryloxyethoxybenzophenone, para-N-(methylacryloxyethyl)-carbamoylethoxybenzophenone, para-acryloxyacetophenone, ortho-acrylamidoacetophenone, acrylated anthraquinones, and the like.

Yet another class of suitable crosslinking agents are the multifunctional radiation-activatable crosslinking agents described in PCT Patent Publication No. WO 97/07161 (Stark et al.), and in U.S. Pat. No. 5,407,971 (Everaerts et al.). An example of these crosslinking agents is 1,5-bis(4-benzoylbenzoxy) pentane. Also suitable are hydrogen-abstracting carbonyls such as anthraquinone, benzophenone, and derivatives thereof, as disclosed in U.S. Pat. No. 4,181,752.

The acrylate copolymers can be crosslinked by exposure to ultraviolet radiation from, for example, medium pressure mercury arc lamps. It is preferred that crosslinking agents activated by ultraviolet radiation be primarily activated by a different wavelength of energy than that used for the polymerization. For example, low intensity black lights may be used for polymerization and mercury arc lamps may be used for the subsequent crosslinking.

The steps may be done in-line, that is, the polymerizable mixture may be surrounded by the packaging material, polymerized, hot melt coated to form a tape, and optionally crosslinked, or the steps may be performed individually at separate times and sites. For example, the packaged prepolymeric mixture may be polymerized at one time, and extruded and crosslinked at another time.

In another preferred bulk polymerization method, the wet-stick (meth)acrylate pressure sensitive adhesives of the present invention are prepared by photoinitiated polymerization methods of the technique described in U.S. Pat. No. 4,181,752. The (meth)acrylate monomers, hydrophilic acidic comonomers, plasticizing agent and a photoinitiator are mixed together in the absence of solvent and partially polymerized to a viscosity in the range of from about 500 cps to about 50,000 cps to achieve a coatable syrup. Alternatively, the (meth)acrylate monomers, hydrophilic acidic comonomers, plasticizing agent may be mixed with a thixotropic agent such as fumed hydrophilic silica to achieve a coatable thickness. The crosslinking agent and any other ingredients are then added to the prepolymeric syrup. Alternatively, these ingredients (with the exception of the crosslinking agent) can be added directly to the monomer mixture prior to pre-polymerization.

The resulting composition is coated onto a substrate (which may be transparent to ultraviolet radiation) and polymerized in an inert (i.e., oxygen free) atmosphere (e.g., a nitrogen atmosphere) by exposure to ultraviolet radiation. Examples of suitable substrates include release liners (e.g., silicone release liners) and tape backings (which may be primed or unprimed paper or plastic). A sufficiently inert atmosphere can also be achieved by covering a layer of the polymerizable coating with a plastic film which is substantially transparent to ultraviolet radiation, and irradiating through that film in air as described in the aforementioned patent using ultraviolet lamps. Alternatively, instead of covering the polymerizable coating, an oxidizable tin compound may be added to the polymerizable syrup to increase the tolerance of the syrup to oxygen as described in U.S. Pat. No. 4,303,485. The ultraviolet light source preferably has 90% of the emissions from about 280 to about 400 nm (more preferably from about 300 to about 400 nm), with a maximum at about 351 nm.

The polymerizable mixture may also contain a crosslinking agent, or a combination of crosslinking agents, to increase the shear strength of the adhesive. Useful crosslinking agents include substituted triazines such as 2,4,-bis (trichloromethyl)-6-(4-methoxy phenyl)-s-triazine, 2,4-bis (trichloromethyl)-6-(3,4-dimethoxyphenyl)-s-triazine, and the chromophore-substituted halo-s-triazines disclosed in U.S. Pat. Nos. 4,329,384 and 4,330,590. Other useful crosslinking agents include multifunctional alkyl (meth)acrylate monomers such as trimetholpropane triacrylate, pentaerythritol tetra-acrylate, 1,2 ethylene glycol diacrylate, 1,4 butanediol diacrylate, 1,6 hexanediol diacrylate, and 1,12 dodecanol diacrylate. Various other crosslinking agents with different molecular weights between (meth)acrylate functionality would also be useful. Generally, the crosslinker is present in an amount of about 0.005 to about 1 weight percent based on the combined weight of the monomers.

Other Additives

As will be understood, other additives can be included in the reaction mixture or added at the time of compounding or coating to change the properties of the adhesive. Such additives, or fillers, include pigments, glass or polymeric bubbles or beads (which may be expanded or unexpanded), fibers, reinforcing agents, hydrophobic or hydrophilic silica, toughening agents, fire retardants, antioxidants, finely ground polymeric particles such as polyester, nylon, and polypropylene, and stabilizers. The additives are added in amounts sufficient to obtain the desired end properties.

The wet-stick pressure sensitive adhesives of the present invention that provide good tack, and good adhesion to both wet and dry surfaces are useful in many industrial, commercial and consumer applications. For example, these good tack, and good adhesion to both wet and dry surface stick adhesives are useful in medical applications, such as tapes, bandages, dressings, and drapes to adhere to dry and to moist skin surfaces such as wounds or areas of the body prone to moistness. Additionally, these good tack, and good adhesion to both wet and dry surface stick adhesives also find use in outdoor or exterior applications, such as on roadway materials, such as pavement surfaces such as asphalt pavement, and in pavement marking tapes, traffic control signage, and marine or automotive coatings and surfaces. Furthermore, labels for food containers and other products that are exposed to moisture due to condensation or subjected to water or ice immersion also can be coated with good tack, and good adhesion to both wet and dry surface adhesives.

EXAMPLES

This invention is further illustrated by the following examples that are not intended to limit the scope of the invention. In the examples, all parts, ratios and percentages are by weight unless otherwise indicated. The following test methods were used to evaluate and characterize the adhesive compositions produced in the examples. All materials are commercially available, for example from Aldrich Chemicals (Milwaukee, Wis.), unless otherwise indicated or described.

Several abbreviations and units are used in the description including the following:

| Abbreviation | Meaning |
| --- | --- |
| Hr | Hour |
| Kg | Kilogram |
| Min | Minutes |
| Ml | Milliliter |
| Mm | Millimeter |
| mW | milliWatt |
| Cm | Centimeter |
| N | Newton |
| Nm | Nanometer |
| 2EHA | 2-ethylhexyl acrylate |
| B-CEA | beta-carboxyethyl acrylate |
| nnDMA | N,N-dimethyl acrylamide |
| IOA | isooctyl acrylate |
| IRG 651 | IRGACURE ™ 651, 2,2-dimethoxy-2-phenyl acetophenone photoinitiator, from BASF Corporation, Florham Park, New Jersey |

-continued

| Abbreviation | Meaning |
|---|---|
| NF-08 | Poly(oxyethylene) alkyl ether ammonium sulfate from Dai-ichi Kogyo Seiyaku Co |
| NF-17 | Poly(oxyethylene) alkyl ether ammonium sulfate from Dai-ichi Kogyo Seiyaku Co |
| LA-12 | Poly(oxyethylene) alkyl ether ammonium sulfate from Dai-ichi Kogyo Seiyaku Co |
| LA-16 | Poly(oxyethylene) alkyl ether ammonium sulfate from Dai-ichi Kogyo Seiyaku Co |
| A208N | Poly(oxyethylene) alkyl ether phosphate from Dai-ichi Kogyo Seiyaku Co |
| MPE-550A | Methoxypolyethyleneglycol acrylate from Osaka Organic Chemical Industry |
| UCON ™ 50-HB400 | random copolymers of polyethylene oxides and polypropylene oxides from Dow Chemical |
| UCON ™ 75-H1400 | random copolymers of polyethylene oxides and polypropylene oxides from Dow Chemical |
| UCON ™ 75-H450 | random copolymers of polyethylene oxides and polypropylene oxides from Dow Chemical |

Test Methods

90° Peel Adhesion to Dry Interlocking Concrete Block

A 25 mm strip sample of the indicated adhesive composition was laminated to corona treated 50 micron thick PET film was attached to dry interlocking block (Water permeable interlocking block. "Pre Stone" Mini Red (200 mm×200 mm×30 mm, 2.3 kg weight/each) from Nakaichi Co., Ltd., Maebashi-city, Gunma, Japan) and rolled down using one pass with a 2 kg weight roller at a speed of approximately 30.5 cm/min. The 90° peel adhesion was measured using a Model RZ-100 Push-Pull gauge (Aikoh Engineering Co., Ltd., Osaka, Japan) by attaching a triangular clip to the free end of the adhesive sample using #880 Filament Tape (3M Company, St. Paul Minn.), attaching the Push-Pull gauge to the triangular clip attached to the adhesive sample and drawing the sample away from the interlocking concrete block at an angle of 90° and at a rate of approximately 10 mm/s. The reading was recorded in Newtons, and the reported data is the average of a number of repeated tests.

Peel adhesions in the range of 5 N/dm or higher, as measured by this procedure, were considered acceptably good for dry stick adhesives of the present disclosure. Peel adhesions greater than 10 N/dm were considered to be "high adhesion" for the present disclosure.

90° Peel Adhesion to Wet Interlocking Concrete Block

A wet interlocking block was prepared as follows:

a) Condition a 30 mm thick Pre Stone Mini Red interlocking concrete block completely submerged in container of 20° C. water for 1 hour.

b) Remove the block from submersion, and placing it in a container containing 20° C. water at a depth such that the bottom 15 mm of the concrete block were immersed in the water. The top 15 mm were not immersed in water.

c) Wipe the top surface of the concrete block with paper towel to remove excess water from the surface to yield a prepared wet block.

With the wet block thus prepared, a 25 mm strip of indicated adhesive was laminated to corona treated 50 micron thick PET film, was attached to the top surface of the wet interlocking block and was rolled down using one pass with a 2 kg weight roller at a speed of approximately 30.5 cm/min.

The container with the interlocking block, water and adhered adhesive sample was covered and sealed with polyethylene film to retain moisture until the peel test was conducted. The intervening time is reported below as dwell time.

A 90° peel adhesion was measured by using Model RZ-100 Push-Pull gauge (Aikoh Engineering Co., Ltd.) by attaching a triangular clip to the free end of the adhesive sample using #880 Filament tape, attaching the Push-Pull gauge to the triangular clip attached to the adhesive sample and drawing the sample away from the interlocking concrete block at an angle of 90° and a rate of approximately 10 mm/s. The reading was recorded in Newtons, and the reported data is the average of a number of repeated tests.

Peel adhesions in the range of 5 N/dm or higher, as measured by this procedure, were considered acceptably good for wet-stick adhesives. Peel adhesions greater than 10 N/dm were considered to be "high adhesion".

Rolling Ball Tack Test

A 300 mm strip (2.54 centimeter wide) of indicated adhesive, notch bar coated on a 50 micron thick PET film, was laid flat, adhesive coated side facing up. Tack was measured per ASTM D3121, rolling ball tack test, using a 1.11 cm diameter steel ball. Results are recorded as travel distance in mm of the steel ball. Travel distance of 60 mm or less is defined as high tack. Travel distance of 250 mm or less is defined as good tack. For some applications, a higher tack corresponding to a travel distance of 30 mm or less, or even 10 mm or less, may be preferred.

Examples 1-13, Comparative Examples C1-C4

Adhesive compositions were prepared as follows

For each Example or Comparative Example, a glass jar was charged with (meth)acrylate monomers, hydrophilic non-acidic or acidic comonomer, non-reactive ionic surfactant, additional monomers, and 0.04% photoinitiator (IRGACURE™ 651) in the amounts shown in Table 1, and stirred until the photoinitiator had dissolved and a homogenous mixture was obtained. Oxygen was removed from the mixture by introducing nitrogen gas into the mixture via a tube inserted through an opening in the jar's cap and bubbling vigorously for at least 3 minutes. The nitrogen flow rate was decrease to a level at which no bubbles were observed and the contents of the jar were gently mixed and exposed to UV-A light until a pre-adhesive syrup having a viscosity deemed suitable for coating was formed. The target viscosity was 3000 to 8000 centipoise.

The nitrogen supply was then stopped and the jar was opened to introduce air into the jar.

The UV-A light source was a black light fluorescent lamps having a peak emission of 350 nanometers, and having over 60 percent of its emission spectrum in the range of from about 280 nm to about 400 nm.

Next, an additional 0.1 wt % IRGACURE™ 651 photoinitiator was added to the pre-adhesive syrup and mixed until the photoinitiator was dissolved.

The resulting pre-adhesive syrup was then coated as follows:

Between two 50 micrometers thick silicone-coated polyester films, pre-adhesive syrup was coated using a notch bar having a gap setting of approximately 400 micrometers greater than the combined thickness of the two support layers. The coated composition was irradiated equally from both sides using UV-A black light fluorescent lamps having a peak emission of 350 nanometers to provide an approximate total energy of 1440 milliJoules/square centimeter. (Top side: 720 milliJoules/square centimeter, Bottom side: 720 milliJoules/square centimeter).

The total UV-A energy was determined using UV integrating radiometer Model UR 365CH from Electronic Instrumentation & Technology (Electronic Instrumentation and Technology, LLC, Sterling, Va.) at a web speed of 1.0 meter/minute. The radiometer web speed and energy were then used to calculate the total energy exposure at the web speed used during curing of the pre-adhesive syrup.

Table 1 lists the respective formulation by component and amount in parts by weight of each illustrative composition. All data is in parts, which is expressed as % of formulation.

| | | | | | Surfactant | | | | | | | Plasticizer | | |
|---|---|---|---|---|---|---|---|---|---|---|---|---|---|---|
| | (a1)/(a2) | Component | Component | | | (b) | | | | Component | UCON™ | UCON™ | | |
| | Weight | (a1) | (a2) | NF- | NF- | LA- | LA- | LA- | | (a3) | 50-HB | 75-HB | | |
| Example | Ratio | IOA 2EHA | 2CEA nnDMA | 08 | 17 | 10 | 12 | 16 | A208N | MPE-550A | 400 | H1400 | UCON™ 75-H 450 |
| 1 | 1.14:1 | — 40 | — 35 | 20 | — | — | — | — | — | 10 | — | — | — |
| 2 | 1.14:1 | — 40 | — 35 | — | 20 | — | — | — | — | 10 | — | — | — |
| 3 | 1.14:1 | — 40 | — 35 | — | — | — | 20 | — | — | 10 | — | — | — |
| 4 | 1.14:1 | — 40 | — 35 | — | — | — | — | 20 | — | 10 | — | — | — |
| 5 | 1.14:1 | — 40 | — 35 | 10 | — | — | — | — | — | 10 | — | — | — |
| 6 | 1.14:1 | — 40 | — 35 | — | 10 | — | — | — | — | 10 | — | — | — |
| 7 | 1.14:1 | — 40 | — 35 | — | — | 10 | — | — | — | 10 | — | — | — |
| 8 | 1.33:1 | 40 — | — 30 | — | — | — | 30 | — | — | — | — | — | — |
| 9 | 1.14:1 | — 40 | — 35 | — | — | — | — | — | 20 | — | — | — | — |
| 10 | 1:1 | — 40 | 40 — | — | — | 20 | — | — | — | — | — | — | — |
| 11 | 1:1 | — 40 | 40 — | — | — | — | — | — | 20 | — | — | — | — |
| 12 | 1:1 | — 40 | — 40 | — | — | 20 | — | — | — | — | — | — | — |
| 13 | 1.5:1 | — 50 | — 33 | — | — | 17 | — | — | — | — | — | — | — |
| C1 | 1.06:1 | — 36 | 34 — | — | — | — | — | — | — | — | 30 | — | — |
| C2 | 1.14:1 | — 40 | — 35 | — | — | — | — | — | — | 10 | — | — | 20 |
| C3 | 1.14:1 | 40 — | — 35 | — | — | — | — | — | — | 10 | — | 20 | — |
| C4 | 1.76:1 | — 51 | — 29 | — | — | 20 | — | — | — | — | — | — | — |

The resultant adhesive compositions were then evaluated for dry block, wet block (at both 20 minute and 60 minute dwell times), and rolling ball tack yielding the results shown in Table 2.

| | Peel from Dry block (N/25 mm) | Peel from Wet block (N/25 mm) | | Rolling Ball Tack |
|---|---|---|---|---|
| Example | 60 min dwell | 20 min dwell | 60 min dwell | (mm) |
| 1 | 8.7 | 17.0 | 30.0 | 35 |
| 2 | 6.1 | 18.0 | 16.0 | 59 |
| 3 | 8.3 | 21.0 | 30.0 | 14 |
| 4 | 5.3 | 16.0 | 12.0 | 81 |
| 5 | 8.0 | 3.8 | 7.0 | 78 |
| 6 | 5.6 | 2.5 | 5.4 | 93 |
| 7 | 8.4 | 6.8 | 8.6 | 30 |
| 8 | 6.7 | 15.0 | 15.0 | 150 |
| 9 | 5.0 | 5.3 | 13.0 | 58 |
| 10 | 5.0 | 5.0 | 7.0 | 27 |
| 11 | 6.0 | 3.0 | 5.0 | 53 |
| 12 | 6.2 | 15.8 | 25.2 | 240 |
| 13 | 5.0 | 6.8 | 10.2 | 40 |
| C1 | 30.0 | 0.9 | 1.8 | 18 |
| C2 | 21.0 | 0.2 | 0.1 | 20 |
| C3 | 6.3 | 1.5 | 0.5 | 37 |
| C4 | 3.0 | 0.8 | 0.8 | 45 |

The data demonstrate that the use of at least 10 wt non-reactive ionic surfactant (by weight based on total weight of the surfactant plus (a1) (meth)acrylate ester monomers and (a2) hydrophilic comonomers) added to a polymer system with a ratio of (meth)acrylate ester monomer to hydrophilic acidic or non-acidic monomer of 1:1 to 1.5:1, provides adhesives with a combination of initial wet and dry adhesion as well good tack. The data demonstrate that when non-reactive ionic surfactant is present in amounts less than 10 wt %, initial wet-stick performance was not achieved.

The invention claimed is:

1. A pressure sensitive adhesive comprising the reaction product of a reaction mixture comprising: (a) polymerizable components (a1) one or more (meth)acrylate ester monomers that when polymerized in the absence of other comonomers yield a polymer or copolymer having a $T_g$ of less than about 10° C.; and (a2) one or more hydrophilic non-acidic comonomers or one or more hydrophilic acidic comonomers; (b) one or more non-reactive, ionic surfactants;

wherein the one or more (meth)acrylate ester monomers and the one or more hydrophilic comonomers are present in a weight ratio of about 1:1 to about 1.5:1 and the surfactant is present at about 10 wt % to about 30 wt %, based on total weight of the surfactant plus (a1) (meth)acrylate ester monomers and (a2) hydrophilic comonomers.

2. The adhesive of claim 1 wherein the one or more (meth)acrylate ester monomers are selected from the group consisting of n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxy ethoxyethyl acrylate, 2-octyl acrylate, monomers comprising structural isomers of a secondary alkyl (meth)acrylate, and mixtures thereof.

3. The adhesive of claim 1 wherein the one or more hydrophilic non-acidic comonomers are selected from the group consisting of N,N-dimethyl acrylamide, N,N-diethyl acrylamide, tert-octyl acrylamide, N,N-dimethyl methacrylamide, N,N-diethyl methacrylamide, n-octyl acrylamide, and mixtures thereof.

4. The adhesive of claim 1 wherein the one or more hydrophilic acidic comonomers is selected from the group consisting of ethylenically unsaturated carboxylic acids, ethylenically unsaturated sulfonic acids, ethylenically unsaturated phosphonic acids, and mixtures thereof.

5. The adhesive of claim 1 wherein the surfactant is selected from the group consisting of ammonium or sodium salts of sulfate and phosphoric acid.

6. The adhesive of claim 1 wherein the reaction mixture further comprises one or more initiators selected from the group consisting of photoinitiators and thermal initiators.

7. The adhesive of claim 6 wherein the one or more initiators is selected from the group consisting of benzoin ethers, substituted benzoin ethers, aromatic sulfonyl chlorides, and photoactive oxides.

8. The adhesive of claim 7 wherein the one or more initiators is selected from the group consisting of hydroperoxides and peroxides.

9. The adhesive of claim 7 wherein the one or more initiators is in an amount of about 0.005 to about 1 wt % based on the weight of the copolymerizable monomers.

10. The adhesive of claim 1 wherein the reaction mixture further comprises one or more chain transfer agents selected from the group consisting of halogenated hydrocarbons, sulfur compounds, and mixtures thereof.

11. The adhesive of claim 10 wherein the reaction mixture comprises from about 0 part to about 10 parts by weight of chain transfer agent per 100 parts of total monomer.

12. A hot melt pressure sensitive adhesive comprises a wet-stick pressure sensitive adhesive having a flow temperature and a thermoplastic packaging material enveloping said wet-stick pressure sensitive adhesive, said thermoplastic packaging material having a melting temperature lower than the flow temperature of the wet-stick pressure sensitive adhesive, wherein said pressure sensitive adhesive comprises the reaction product of a reaction mixture comprising (a) polymerizable components (a1) one or more (meth)acrylate ester monomers that when polymerized in the absence of other comonomers, yield a polymer or copolymer having a $T_g$ of less than about 10° C.; and (a2) one or more hydrophilic non-acidic comonomers or one or more hydrophilic acidic comonomers; and (b) one or more non-reactive, ionic surfactants;

wherein the one or more (meth)acrylate ester monomers and the one or more hydrophilic comonomers are present in a weight ratio of about 1:1 to about 1.5:1 and the surfactant is present at about 10 wt % to about 30 wt %, based on total weight of the surfactant plus (a1) (meth)acrylate ester monomers and (a2) hydrophilic comonomers.

13. An article a substrate; and a hot melt pressure sensitive adhesive applied to a surface of said substrate, said hot melt adhesive comprising a mixture of a pressure sensitive adhesive having a flow temperature and a thermoplastic material having a melting temperature that is less than the flow temperature of the pressure sensitive adhesive, said pressure sensitive adhesive the reaction product of a reaction mixture comprising (a) polymerizable components (a1) one or more (meth)acrylate ester monomers that when polymerized in the absence of other comonomers, yield a polymer or copolymer having a $T_g$ of less than about 10° C.; and (a2) one or more hydrophilic non-acidic comonomers or one or more hydrophilic acidic comonomers; and (b) one or more non-reactive, ionic surfactants;

wherein the one or more (meth)acrylate ester monomers and the one or more hydrophilic comonomers are present in a weight ratio of about 1:1 to about 1.5:1 and the surfactant is present at about 10 wt % to about 30 wt %, based on total weight of the surfactant plus (a1) (meth)acrylate ester monomers and (a2) hydrophilic comonomers.

14. A method for preparing a pressure sensitive adhesive comprising the steps of:
(1) preparing a solventless reaction mixture comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic non-acidic comonomers or one or more hydrophilic acidic comonomers; and (b) one or more non-reactive, ionic surfactants,
wherein the one or more (meth)acrylate ester monomers and the one or more hydrophilic comonomers are present in a weight ratio of about 1:1 to about 1.5:1 and the surfactant is present at about 10 wt % to about 30 wt %, based on total weight of the surfactant plus (a1) (meth)acrylate ester monomers and (a2) hydrophilic comonomers; and
(2) reacting the reaction mixture to polymerize the polymerizable components to yield the pressure sensitive adhesive.

15. A method for preparing a hot melt pressure sensitive adhesive comprising the steps of:
(1) preparing a solventless reaction mixture comprising (a) polymerizable components (a1) one or more (meth)acrylate ester monomers that when polymerized in the absence of other comonomers yield a polymer or copolymer having a $T_g$ of less than about 10° C.; and (a2) one or more hydrophilic non-acidic comonomers or one or more hydrophilic acidic comonomers; and (b) one or more non-reactive, ionic surfactants,
wherein the one or more (meth)acrylate ester monomers and the one or more hydrophilic comonomers are present in a weight ratio of about 1:1 to about 1.5:1 and the surfactant is present at about 10 wt % to about 30 wt %, based on total weight of the surfactant plus (a1) (meth)acrylate ester monomers and (a2) hydrophilic comonomers;
(2) enveloping the polymerizable composition in a thermoplastic packaging material; and
(3) exposing the enveloped polymerizable composition to radiation in an amount sufficient to polymerize the polymerizable components and to form the pressure sensitive adhesive having a flow temperature,
wherein the thermoplastic packaging material has a melting temperature lower than the flow temperature of the pressure sensitive adhesive.

\* \* \* \* \*

UNITED STATES PATENT AND TRADEMARK OFFICE
CERTIFICATE OF CORRECTION

PATENT NO. : 11,441,056 B2  
APPLICATION NO. : 16/625413  
DATED : September 13, 2022  
INVENTOR(S) : Shinobu Sato et al.

Page 1 of 1

It is certified that error appears in the above-identified patent and that said Letters Patent is hereby corrected as shown below:

In the Claims

<u>Column 19</u>

Line 41, In Claim 13, after "An article", insert --comprises--.

Line 47, In Claim 13, after "said pressure sensitive adhesive", insert --comprises--.

Signed and Sealed this  
Seventh Day of March, 2023

Katherine Kelly Vidal  
*Director of the United States Patent and Trademark Office*